United States Patent [19]
Andriessen et al.

[11] 4,302,958
[45] Dec. 1, 1981

[54] MAKING RINGS FROM TUBE STOCK

[75] Inventors: Ronald C. Andriessen; Peter J. Holt, both of Cheltenham, England

[73] Assignee: Formflo Limited, Cheltenham, England

[21] Appl. No.: 107,369

[22] Filed: Dec. 26, 1979

[30] Foreign Application Priority Data

Dec. 27, 1978 [GB] United Kingdom ............... 50043/78

[51] Int. Cl.³ .......................... B23B 1/00; B23B 5/16
[52] U.S. Cl. ......................................... 72/71; 82/47; 82/56; 82/83; 82/95; 82/101
[58] Field of Search ................... 82/101, 46 R, 47, 56, 82/76, 83, 92, 94, 95; 72/71, 70

[56] References Cited
U.S. PATENT DOCUMENTS

4,126,064 11/1978 Tarrent ............................... 82/47 X

Primary Examiner—J. M. Meister
Attorney, Agent, or Firm—Diller, Ramik & Wight

[57] ABSTRACT

The invention relates to methods and apparatus for making rings from tube stock (10) by a part-off rolling tool (12,15) which is advanced radially into the tube stock to form successive rings, e.g. annular blanks for subsequent roll forming into bearing rings. The tube stock is indexed forward after separation of each ring. Errors in the length of tube stock indexed forward each time are contained by forming a locating groove (47) on the tube stock by means of a groove-rolling tool (40) set at an appropriate axial distance from the part-off rolling tool (12) and moved radially with it. In the next cycle the groove (47) automatically centers the part-off tool as the latter begins its advance into the tube stock, so as to give the correct axial length of the finished ring. The part-off tool is stopped before fully penetrating the tube wall, which is then machined. Final separation takes place during this machining or in a subsequent finishing pass by the part-off tool.

16 Claims, 7 Drawing Figures

MAKING RINGS FROM TUBE STOCK

This invention relates to methods and apparatus for making a succession of rings from tube stock, such method including:
(i) supporting the tube stock on a central axis and effecting relative rotation about the central axis as between the tube stock and a part-off type rolling tool capable of limited, controllable axial movement, whilst
(ii) advancing the rolling tool in a generally radial direction into the tube stock to form a circumferential parting groove to a depth approximately equal to the required wall thickness of the ring;
(iii) stopping the advance of the rolling tool just in time to avoid complete severance of an annular end portion from the tube stock by the rolling tool;
(iv) subsequently completing severance of the end portion to constitute a said ring;
(v) after stopping the advance of the rolling tool but whilst the end portion is not yet fully severed machining the unsevered circumferential surface of the end portion to its required diameter;
(vi) radially retracting the rolling tool; and
(vii) axially feeding the tube stock forward ready for making the next ring.

Such a method will be referred to in this specification as a "method of the kind hereinbefore specified."

Apparatus, suitable for carrying out a method of the above kind and including: a chuck for supporting tube stock cantilevered therefrom on a central axis; a part-off type rolling tool mounted for limited, controllable axial movement and arranged to be moved in a generally radial direction into tube stock so supported, through one circumferential surface of the latter and towards the other, the chuck and rolling tool being arranged for relative rotation about the central axis; and means for machining the said other circumferential surface, will be referred to as "apparatus of the kind hereinbefore specified."

Apparatus and methods of this kind are described in our United Kingdom patent specification No. 1 535 562, which describes a machine for preparing rings in the form of annular workpieces for subsequent working, for example to be shaped into races for rolling bearings. Processes for performing ring rolling are described in our United Kingdom patent specification Nos. 1 329 521, 1 378 508, 1 384 387, 1 384 388, 1 395 726 and 1 475 777-80.

The method described in United Kingdom patent specification No. 1 535 562 is essentially one in which successive rings are made by parting them off from the tube stock entirely, or virtually entirely, by a rolling process so that parting-off involves negligible or no wastage of metal. Metal displaced during the roll parting is displaced into the ring itself, and the only machining required is that which may be necessary to produce the accurate inside and outside diameters of the ring and for such operations as chamfering and de-burring. All of these machining operations are relatively light, so that the elimination of waste by adoption of the roll-parting technique saves a significant part of that metal which would otherwise have been wasted.

A feature of the method of United Kingdom patent specification No. 1 535 562 is that parting-off takes place in two stages. The second stage may be effected at the end of the machining operation (step (v)) by the machining tool itself. Alternatively the main rolling operation may be stopped (step (iii)) at a point where sufficient thickness of metal remains for the end portion which is to be removed to be still attached to the remainder of the tube stock by a thin annular web, even after completion of the machining operation. In this latter case, the rolling tool is advanced by a further amount so as to complete the parting-off by removing this web. Whichever of these two alternatives is adopted, it is found that the two-stage parting-off process significantly reduces the resulting burr, and consequently the wastage of metal involved in de-burring. The method displays other advantages also, and for a fuller discussion United Kingdom patent specification No. 1 535 562 should be consulted.

After each ring has been made, the tube stock is fed forward in step (vii) through a distance which should ideally be exactly equal to the required width (i.e. axial length) of the next ring to be made. The tube stock is so fed by conventional means which are very well known in the machine tool art. However, in order that the present invention may be fully understood, it is worth while briefly to describe here a typical conventional tube stock feeding mechanism which does not form part of the present invention, but which is the preferred feed mechanism for use in an apparatus according to the invention.

The chuck is of the collet type and forms part of a main spindle assembly of the apparatus. This main spindle assembly comprises two main elements, viz:
(a) The collet and a collet closing mechanism; and
(b) The feed mechanism.

The collet is rotated at constant speed, and has a simple opening and closing action to enable the tube stock to be gripped and rotated, with the collet closed, during the parting and machining operations (steps (ii) to (v) of the method of the kind hereinbefore specified), and to be released by opening the collet for the forward feed of step (vii). The closing action of the collet is obtained by drawing it back into a tapered housing.

The feed mechanism comprises a feed tube which can be actuated in an advancing or retracting mode along the central axis of the apparatus; a so-called feed finger which is carried coaxially by the feed tube; and an operating mechanism for operating the feed finger and for moving the feed tube forward or back. The feed finger is situated immediately behind the collet of the chuck, and consists of a tubular member with spring loaded fingers encircling the tube stock so as to grip the latter in the manner of a spincter. The tube stock is introduced through the feed tube and through the feed finger, so that the spring loaded fingers are in engagement with the tube stock at all times.

The sequence of operation during step (vii) is as follows:
1. Collet opens.
2. Feed tube and feed finger advance through a distance equal to the axial length of the next ring to be made, carrying the tube stock forward by the same amount.
3. Collet closes.
4. Feed tube and feed finger retract. Because the tube stock is now held by the collet, the spring fingers of the feed finger slide back over the tube stock in readiness for the next feeding operation.

Unfortunately, although a feed system of this kind is reliable, simple and well proven, it does involve many inherent inaccuracies in operation, giving rise to variations in the actual stroke (i.e. length of feed) as between one feeding operation and another. For example, when the collet closes by being drawn back into its tapered housing, it tends to drag the tube stock back with it. The extent of this unwanted retraction of the tube stock depends on the outside diameter of the latter. Since the outside diameter of commercially produced tube not infrequently varies over the length of each tube, it is not practicable to compensate for the consequent variations in length of draw-back by the collet without machining the whole of the outside surface of the length of tube stock before introducing it into the ring-making apparatus—an obviously undesirable expedient, being both difficult and wasteful of energy, material, manpower and money. In addition, the average outside diameter of commercially produced tube can vary from one tube to another.

Furthermore, slippage can occur between the tube stock and the spring fingers of the feed mechanism; and this tends to vary according to the length of the tube stock and is therefore, in practice, not readily controllable nor can it easily be compensated for. Finally, the relaxation of clearances in the machine elements engaging the tube stock, resulting from opening of the collet, often causes a slight draw-back of the tube stock to occur. The amount of this draw-back is again unpredictable and it is impracticable either to control or to prevent it.

As a result of these various sources of inaccuracy it has been found necessary to accept an overall tolerance of at least 0.305 mm (0.012 inch) in the axial length of the rings (ring width) made by a method of the kind hereinbefore specified. Even this figure assumes ideal conditions, and in practice the variations in ring width tend to be much greater.

For many applications such wide variations in ring width are quite unacceptable. Where the rings are to be used as workpieces for manufacture of rings for rolling bearings, for example, using the methods described in the specifications of our aforementioned patents, an overall tolerance of 0.152 mm (0.006 inch), or better, is called for.

A principal object of the present invention is therefore to achieve greatly improved control of the axial length of rings made by the method, and/or in the apparatus, of the kind hereinbefore specified.

Accordingly, the invention in a first aspect provides a method of the kind hereinbefore specified in which a circumferential locating groove is formed on the tube stock whilst an end portion of the latter is in the process of being separated by the part-off rolling tool to form a ring. The locating groove serves to guide the part-off rolling tool, at the commencement of its advance into the tube stock, into the exact axial position required for parting off the next end portion. In order that the locating groove shall be formed in exactly the right axial position on the tube stock, it is formed by a grooving tool which is spaced axially from the part-off rolling tool by a fixed predetermined distance which can be accurately set by, for example, the use of a suitable spacer whose length is precisely determined by appropriate machining. The grooving tool is advanced, simultaneously with the rolling tool, in the same generally radial direction. When during step (vii) the tube stock is fed forward ready for making the next ring, the locating groove stops in a position opposite the rolling tool. The above-mentioned spacing between the two tools is chosen so that as the rolling tool is advanced into contact with the tube stock, the axial position to which it is guided is exactly correct (within permitted tolerances) for the tube stock end portion to be of the required axial length. It is inherent in the method that the limited axial movement of the rolling tool be sufficient to permit this guidance to be effective. The locating groove is substantially V-shaped to ensure accurate guidance of the tool into exact register with it.

In this way variations in the feed distance (feed-up errors), explained above, can be compensated for, so that tolerances on the axial length of each ring can be reduced to those set only by the tools themselves. It will of course be understood that the width of the V-shaped groove at the circumference of the tube stock must be sufficient to allow the rolling tool to enter the groove in the most extreme case of feed-up error, i.e. it must be slightly greater than the maximum possible feed-up error for the particular machine concerned.

The method of this invention is suitable for use whichever of the two alternative ways of completing the parting-off operation, described earlier herein, are used. In the case where severance of the end portion from the remainder of the tube stock is completed by the actual machining in step (v), the locating groove is fully formed during the main roll-parting operation of step (ii). If, on the other hand, final severance is effected by the rolling tool after the machining operation, the locating groove is itself completed to its full depth during this second operation of the rolling tool.

In a second aspect, the invention provides apparatus of the kind hereinbefore specified, in which a grooving tool, operating in the manner already described, is mounted with the rolling tool to form (with an appropriate spacer as discussed above, or other means for ensuring the correct fixed, predetermined axial spacing between the two tools) a unit rotatable about a common tool axis in the body of a tool head. The tool head is movable in a generally radial direction towards and away from the central axis of the apparatus.

It has been seen that some axial movement of the tools is necessary, with respect to the chuck. To this end the whole tool head may be so mounted as to be capable of this movement. We prefer, however, to arrange the tool head itself for true radial movement, and to mount the rotatable tool unit in the tool head body in such a way that it can move axially in the body. During the advance of the rolling tool into the tube stock, there is a small axial component to the direction of movement of the tool due to the fact that metal is displaced in the rolling operation towards the free end of the tube, thus allowing the rolling tool to follow a path determined by the profile of its own working surface. However, the axial movement which must be permitted in order to allow for feed-up error is greater than this axial component. The total axial movement which has to be allowed for is the sum of the greatest movement required to allow to feed-up error and that required during operation of the part-off rolling tool. The axial movement of the tools must be controllable, in the sense that it must take place only to the extent that displacement from a "normal" or datum position is required. To this end, the tool head preferably includes springs which bias the tool unit towards its datum position but which allow it to move a sufficient amount to either side of that position.

The tube stock is cantilevered from the chuck, and for most purposes some form of back-up support is needed to prevent undue deflection of the tube during the rolling operations. This support is preferably provided by at least one further tool head, arranged to move radially towards the central axis to engage the tube stock, and away from it to allow the tube stock to be advanced in step (vii). Such a tool head may be identical in both construction and operation with the main tool head, save to the extent that it is not necessary to provide the grooving tool otherwise than on the main tool head. In this event, the second tool head of a machine having two tool heads may have a part-off rolling tool arranged diametrically opposite that of the first head and will then be arranged to move in exact synchronism with it. Alternatively, the rolling tool of the second head may be a simple back-up roll having a profile similar to that of the grooving tool, so that the back-up roll merely rests in the locating groove in which the rolling tool of the main head is advancing into the tube stock.

There may be any convenient number of tool heads, and where there are more than two, the heads additional to the main tool head may have part-off tools or back-up rolls; or one of these additional heads may have a part-off tool whilst another has a back-up roll. The tool heads are preferably equally spaced around the central axis.

For most applications it is preferable that the rolling tool or tools, and the grooving tool, should be external to the tube stock, so that in step (ii) they are advanced towards the central axis. The machining operation in step (v) then takes place on the bore of the tube stock (whether or not other machining operations elsewhere on the end portion of the tube stock are carried out at the same time). For this purpose the apparatus preferably includes a tool holder, for example in the form of a tailstock or a turret movable axially in a direction parallel to the central axis, the tool holder carrying a boring tool which performs the machining operation on the tube bore. However, particularly in the case of a tube stock of very large bore, a method according to the invention may be carried out using one or more rolling tools inside the bore of the tube stock, the diameter of the (or each) rolling being substantially smaller than the bore of the tube. In this case the rolling tool and its associated grooving tool are advanced in step (ii) away from the central axis; and the machining operation in step (v), and final severance of the ring from the remainder of the tube stock, take place on the outer circumference instead of on the bore.

Where the bore diameter of the tube permits, with external rolling and grooving tools the end portion of the tube stock may be supported internally by a back-up roll or a mandrel, as an alternative to the provision of an external back-up head or heads. The internal back-up roll or mandrel will be retractable axially in a direction away from the chuck at the end of the process for making a ring; and such a mandrel may be of a suitable kind to engage each ring in turn internally, so as to withdraw it in a controlled manner and thus avoid any need for the ring to be dropped as soon as it has been parted off.

It will be understood that apparatus according to the invention may consist of a single-spindle machine, having only one chuck, or a multi-spindle machine having two or more spindles. Thus, for example, a multi-spindle machine may have a pair of opposed turrets, one of which has several chucks, each with its own tube stock feed mechanism and each having a tool head or set of tool heads for performing the roll parting and grooveforming operations. The other turret has machining heads movable axially towards and away from the chucks.

A suitable indexing mechanism is preferably provided, whether the apparatus is of a single-spindle or multi-spindle kind, for automatically indexing the tube stock forward in step (vii) by the required amount, which can be made adjustable by any known means. Furthermore, the method of the invention lends itself to fully-automatic operation; this can be achieved by application of wellknown control system techniques to the apparatus.

Embodiments of the invention will now be described, by way of example only, with reference to the drawings hereof, in which.

Figure 2:
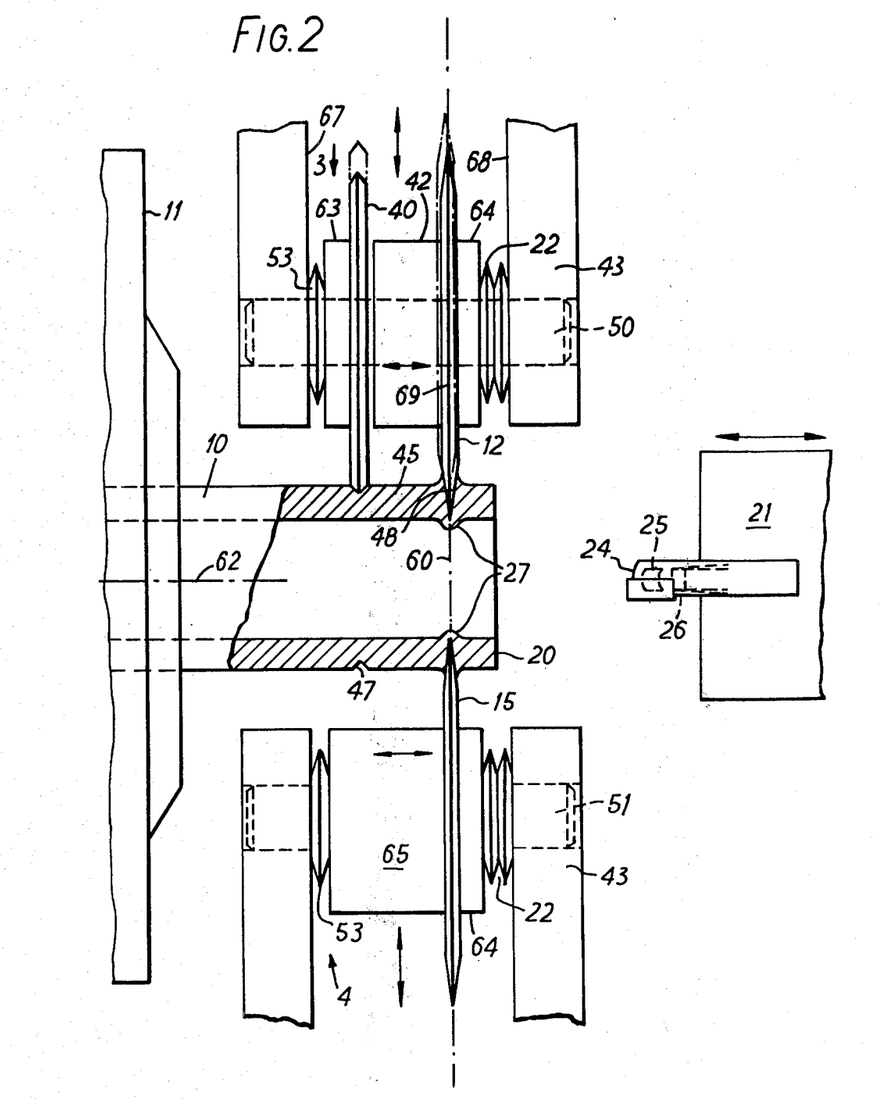
FIG. 2 is an enlarged plan view showing that part of a first embodiment of an apparatus according to the present invention which differs from the apparatus shown in FIG. 1 (FIG. 2 showing a stage prior to the making of the first of a succession of rings by a method according to the invention)
Figure 3:
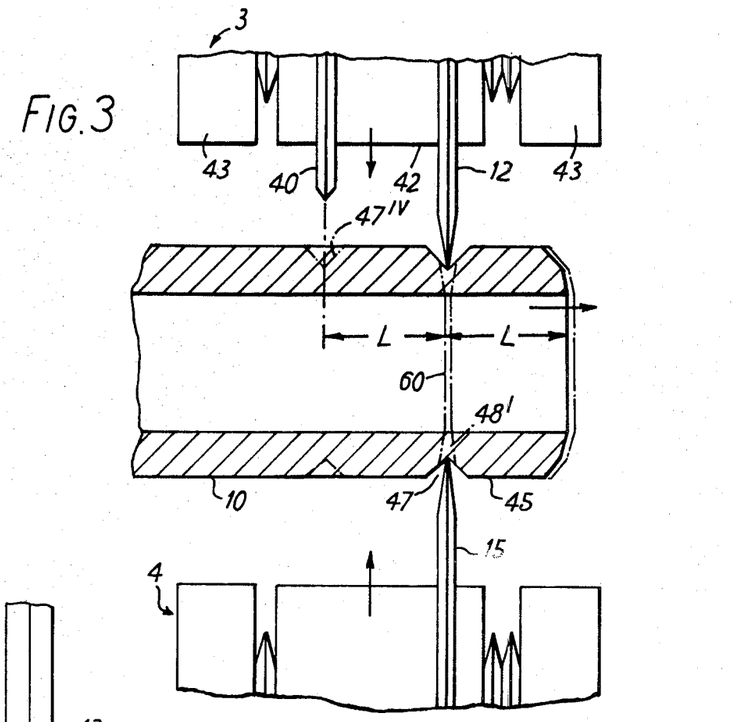
FIG. 3 corresponds to part of FIG. 2 and shows the beginning of the parting-off operation for the first ring.
Figures 4, 5, 7:
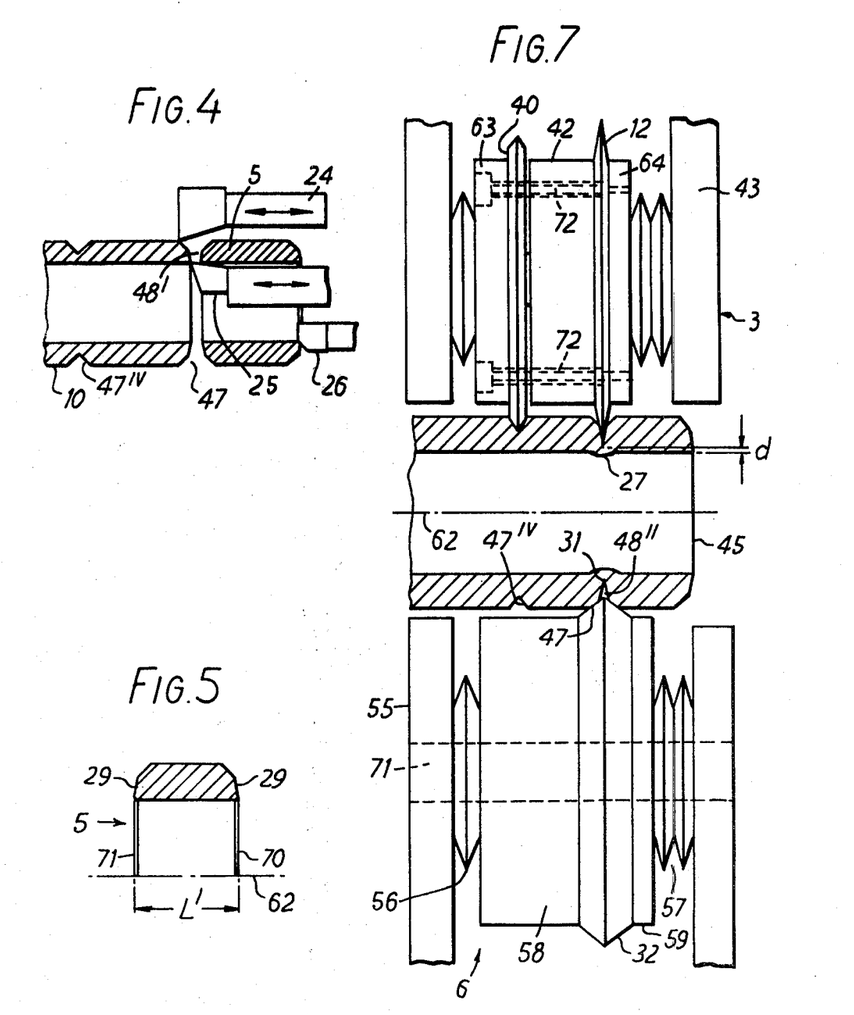
FIG. 4 is a scrap elevation illustrating the final severance of the ring from the tube stock in the said method.
FIG. 5 is a diametral section showing one half of the finished ring.
FIG. 7 is similar to FIG. 2 but shows a second embodiment.

The apparatus in its various forms shown in FIGS. 2 to 4 and FIG. 7 is a blank preparation machine arranged to make a succession of rings 5 as shown in FIG. 5 from steel tube stock 10. The ring 5 is a workpiece or blank for subsequent forming, by a roll forming process, into a bearing race for a rolling bearing.

Figure 1:
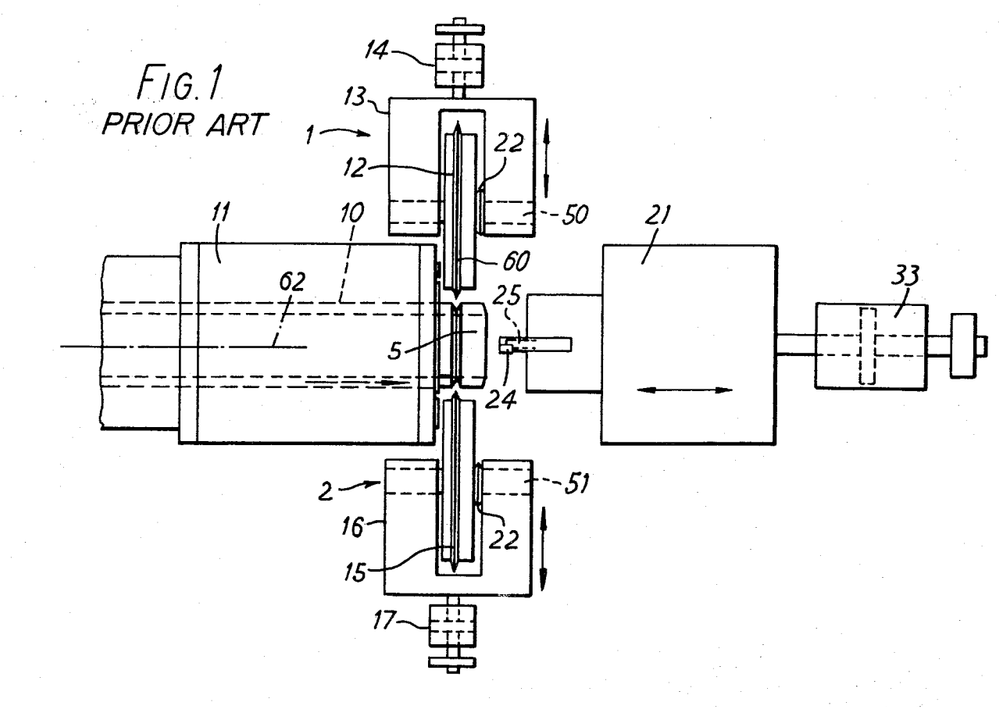
FIG. 1 is a plane view of an apparatus of the kind hereinbefore specified, not according to this invention but substantially as described in United Kingdom patent specification No. 1 535 562.

FIG. 1 also shows a blank preparation machine for making blanks similar to the rings 5. Referring to FIG. 1, the machine, of the single-spindle type, has a chuck 11 of the conventional collet type, for supporting the tube stock 10, cantilevered from the chuck, on a central axis 62. Adjacent to the chuck, and on either side of the tube stock 10 projecting from the chuck, are two identical, diametrically-opposed tool heads 1,2. Each tool head comprises a yoke 13 and 16 respectively, which are movable radially towards and away from the axis 62 by hydraulic actuators 14 and 17 respectively. Each yoke 13,16 has a transverse pin 50,51 respectively which carries a respective rotatable part-off rolling tool 12 and 15. Each of these rolling tools is biassed by a disc spring or a Belleville washer 22 towards a left-hand or datum position from which it can be moved axially to the right by a limited amount against its spring 22.

A tailstock or machining head 21 is movable, towards and away from the chuck in directions parallel to the axis 62, by a hydraulic actuator 33. The tailstock carries a cutting tool 24 to machine the outer circumferential surface of the ring 5, a boring tool (not visible) to machine the bore of the ring, and a chamfering tool (also not visible).

Referring now to FIGS. 2 to 4, the machine shown in these Figures, and now to be described, differs from that shown in FIG. 1 only in the construction of the tool heads and in the aspects of its operation resulting from those differences. In FIG. 2, there are shown a main tool head 3 and a second tool head 4. The main tool head 3 comprises a tool head body, in the form of a yoke 43, carrying the pin 50 which provides a tool axis parallel to the central axis 62. The part-off rolling tool 12 is again mounted on the pin 50, but so also is a further tool, viz. a grooving tool 40 of smaller diameter than the tool 12 and having a V-shaped working surface which subtends an angle which may be of any suitable value for the purpose to be described below, but in this example it is 45 degrees. The tools 12 and 40 are separated by a spacer ring 42 which is accurately machined to a length such that the effective axial distance L (FIG. 3) between the two holes has a fixed, predetermined value which is equal to, or bears a known relationship to, the final axial length (ring width) L' of the ring 5 (FIG. 5). The grooving tool 40 is separated from the nearest transverse face 67 of the yoke 43 by a spacer ring 63 and a pair of disc springs 53, whilst the rolling tool 12 is separated from the opposite face 68 by a spacer ring 64 and disc springs 22.

The second tool head 4 is identical with the head 3 except that, in place of the grooving tool 40 and spacer ring 42,63 there is a single spacer ring 65 whose length is equal to the combined axial length of the components 40,42 and 63. The rolling tools 12,15 of the heads 3 and 4 respectively define a common centre plane 60, FIG. 2. The tools 12,15 and 40 are freely rotatable on their pins 50 and 51.

The chuck 11 is rotated continuously by conventional drive means (not shown) throughout the operations now to be described. The tube stock 10 is fed from the rear through the chuck 11 by conventional means such as that described earlier herein, and is held by the chuck in the position shown in FIG. 2, with its leading end just past the rolling tools 12 and 15. The hydraulic actuators 14,17 (which are as in the machine of FIG. 1) operate to advance the tool heads 3 and 4 simultaneously toward the central axis 62 until the rolling tools 12,15 have formed a circumferential parting groove 48 to a depth equal to the required wall thickness of the rings subsequently to be made. The advance of the tools is stopped at this point (which is the situation shown in FIG. 2), at which the end portion 20 of the tube stock is still attached to the remainder of the latter by an annular bulge 27 formed in front of the parting groove 48 as it is deepened. The tool heads are now fully retracted and the machining head 21 is advanced by the actuator 33 so that the boring tool, shown at 25 in FIGS. 2 and 4, machines the bore to its final diameter and also removes the bulge 27. The unwanted end portion 20 falls away. The head 21 is retracted.

Towards the end of the advance of the rolling tools 12,15 through the tube stock, the grooving tool 40 reaches the surface of the latter so that, by the time the parting groove 48 is completed, the tool 40 has formed on the tube stock a substantially V-shaped, circumferential locating groove 47, which is spaced axially from the groove 48 by the centre-to-centre distance L, the groove 47 lying on the opposite side of the parting groove 48 from the annular end portion 20. During this operation and because metal is being displaced by the part-off rolling tools, the end portion 20 moves axially to the right. This is illustrated in FIG. 2, in which the original position of the end face of the portion 20 is indicated by a phantom line. This movement enables the movement of the tools 12 and 15, as they form the groove 48, to have a small axial component in the same direction, so that the resultant direction of movement of each tool 12,15 is parallel to its left-hand inclined working face 69. A conical inclined end face 29 (FIG. 5) is thus formed on the leading end of what will later become the first of the required rings 5, a similar face being formed at the same time on the rear end of the end portion 20.

Figure 6:
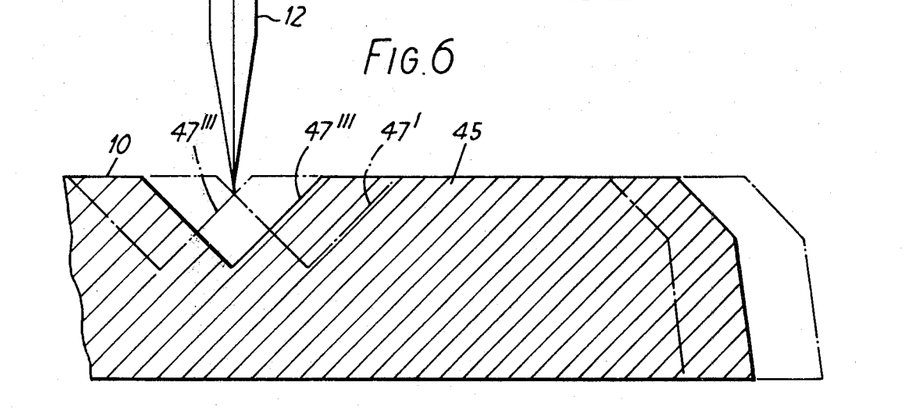
FIG. 6 is an enlarged sectional view illustrating the function of the locating groove.

As the tool 12 makes the parting groove 48, its axial component of movement compresses the springs 22, and allows the springs 53 to urge the grooving tool 40 to the right also, so maintaining the spacing between tools 40 and 12 until the tool 40 has begun to form the locating groove 47. Now the tool 40 is constrained against further axial movement, so that it forms the groove 47 by pure radial movement to produce a symmetrical groove profile as shown in FIG. 6 at $47^{II}$. On the other hand, the spacer 42, though normally in endwise engagement with the tools 40 and 12, is not fixed to them; thus the tool 12 remains free to move parallel to its surface 69.

When the tool heads 34 are retracted, the tools 40, 12 and 15 are restored by the springs 22 or 53 to their normal or datum axial position, indicated by phantom lines on the head 3 in FIG. 2, which is the position when the springs 22,53 are at rest.

The tube stock is now indexed forward by a distance which is nominally equal to the distance L but which is subject to the errors inherent in the method of feeding discussed earlier in this specification. The locating groove 47 now lies opposite the rolling tools 12,15. FIG. 6 shows at $47^{II}$ the position of this groove in relation to the tool 12 if feed-up error is totally absent, i.e. if the feed distance is exactly equal to L. The positions corresponding to the maximum and minimum feed distances likely to be found in practice are indicated at $47^{I}$ and $47^{III}$ respectively. The cycle of operation already described is now repeated, to make the first of a succession of the rings 5 from what is now an end portion 45 of the tube stock 10. The moment of initial contact of the tools 12,15 with the tube stock is shown in FIG. 3; they are guided to the position shown, in exact register with the locating groove 47, by the groove 47 itself, and to this end the tools 12,15,40 are all moved axially, controlled by the groove 47 and the springs 22,53, until the tools 12,15 rest in the bottom of the locating groove. Again, as a new parting groove $48^{I}$ is formed there is some slight axial movement to the right by the end portion 45 and by the three tools, and the tool 40 forms a new locating groove $47^{IV}$, ready for making the second ring 5.

Referring now to FIG. 4, in the machining operation which takes place when the grooves 47 and 48 have been formed, an external turning tool 24, set slightly in advance of the boring tool, 25, finishes the outer cylindrical surface at the same time as the tool 25 is machining the bore, and whilst the chamfering tool, 26, makes the leading chamfer shown in FIG. 5 at 70. Finally the boring tool reaches the parting groove $48^{I}$ to effect final parting of the ring 5 from the tube stock. A rear chamfer 71 (FIG. 5) is subsequently formed, after final separation of the ring 5, by a separate machining operation.

FIG. 7 illustrates three possible variations on the above technique, viz. (a) the use of a single part-off rolling tool 12 with a back-up roll 32; (b) the use of the part-off rolling tool to effect final separation of the ring 5 instead of relying on the boring tool for this purpose; and (c) the use of a unitary tool assembly in each tool head. Variations (b) and (c), or either of them, may equally well be employed with the apparatus of FIGS.

2 and 3; whilst the procedure described with reference to FIGS. 2 to 4, i.e. forming the parting groove to the full final thickness of the tube wall and then using the boring tool 25 to complete the separation of the ring 5, can be used with the apparatus of FIG. 7.

In FIG. 7, the apparatus is the same as in FIG. 2 except that a tool head 6 is substituted for the head 4 and the tool head 3 has a unitary tool assembly. The tool head 6 has a yoke 55 carrying a horizontal pin 71 on which a back-up roll 32, having a V-shaped profile subtending an angle of 45 degrees, is freely rotatable. The back-up roll 32 is spaced from the arms of the yoke 55 by disc springs 56 and a spacer 58 on one side, and by disc springs 57 and a spacer 59 on the other. It engages in the locating groove 47 to oppose the radial forces imposed by the part-off rolling tool 12. The roll 32 can if desired be so shaped as to form chamfers or radii at the corners of the groove 47.

With regard to the use of the tool 12 to effect final separation, this technique is useful in, for example, cases where excess turning stock is not permissible in the bore of the tube, since it reduces even further the amount of metal lost in machining. It is carried out as follows.

The tool heads 3 and 6 are advanced simultaneously until the back-up roll is fully engaged in the locating groove 47, at which point advance of the head 6 is stopped, its hydraulic actuator being locked against further radial movement by conventional hydraulic means, so that the back-up roll 32 acts effectively as an anvil against the action of the tool 12. The tool head 3, however, continues to advance as previously described, to form a parting groove $48^{II}$. Preferably, the inward radial movements of the tool heads 3 and 6 are so synchronised that the tool 12 reaches the bottom of the locating groove 47 simultaneously with the roll 32 becoming fully engaged with the same groove. The advance of the tool 12 is continued until the bottom of the parting groove $48^{II}$ reaches a point at a radial distance d from the bore of the tube stock. Typically d is about 0.38 mm (0.015 inch). At this point, the radial movement of the tool head 3 is stopped, its hydraulic actuator being locked against further radial movement by conventional hydraulic means. The next locating groove, $47^{IV}$, is now nearly, but not quite, completed, whilst the end portion 45 remains attached to the remainder of the tube stock by a narrow ring 31 of thickness d and by the bulge 27.

Machining by the tools carried by the tailstock 21 (not shown in FIG. 7) is then performed as described with reference to FIG. 4; though it should be noted that in this method in which the ring 31 is present, the tool 24 need not be in advance of the tool 25. In addition the tool 25 removes a smaller thickness of metal from the bore of the end portion 45 before it reaches the bulge 27, which it removes. The chamfer 71, if required, may be formed in a separate, subsequent, operation on another machine.

After retraction of the head 21, the hydraulic actuator of the tool head 3 is unlocked to drive the latter forward once again until the part-off tool 12 removes the ring 31, thus effecting complete separation of the end portion 45 from the tube stock. At the same time the grooving tool 40 completes the formation of the locating groove $47^{IV}$.

It will be understood that the back-up roll 32 is guided into the locating groove in the same way as described for tool 12 with reference to FIG. 6, and that the various spacing rings provided on the tool heads may be replaced by other rings to set the spacing L between the part-off rolling tool and the grooving tool at any desired value, and to ensure that the part-off tool of the main tool head is axially aligned with the corresponding tool or back-up roll of the other head. As discussed earlier herein, there may be any convenient number of tool heads.

In the tool head 3, the abovementioned unitary tool assembly comprises the tools 12 and 40 and spacers 63,42,64 as before. However, in this case these five components are securely bolted together by means of bolts 72, so that they rotate as a unit and also move axially as a unit. Thus, as the parting groove $48^{II}$ is formed, there is a slight axial component in the movement of the tool 40 as it forms the locating groove $47^{IV}$. In practice, the resulting asymmetry in the shape of the groove $47^{IV}$ is small enough to be acceptable in most applications. In the tool head 6, the spacers 58,59 may be secured to the back-up roll 32 or not, as desired.

Where a unitary tool assembly is provided, it may comprise a single member in which spacer portions are integral with the tool or tools, instead of being separate members secured together and to the tool or tools.

We claim:

1. A method for in succession making rings from tube stock, including the steps of:
   (i) supporting the tube stock on a central axis and effecting relative rotation about the central axis as between the tube stock and a part-off type rolling tool capable of limited, controllable axial movement, whilst
   (ii) advancing the rolling tool in a generally radial direction into the tube stock to form a circumferential parting groove to a depth approximately equal to the required wall thickness of the ring;
   (iii) stopping the advance of the rolling tool just in time to avoid complete severance of an annular end portion from the tube stock by the rolling tool;
   (iv) subsequently completing severance of the end portion to constitute a said ring;
   (v) after stopping the advance of the rolling tool but whilst the end portion is not yet fully severed, machining the unsevered circumferential surface of the end portion to its required diameter;
   (vi) radially retracting the rolling tool; and
   (vii) axially feeding the tube stock forward ready for making the next ring;

characterised in that a grooving tool is advanced in a generally radial direction simultaneously with the rolling tool, to form on the tube stock a substantially V-shaped, circumferential locating groove spaced axially from the parting groove by a predetermined distance with the parting groove lying between the locating groove and the annular end portion, the tube stock in step (vii) being fed forward by an amount approximately equal to said predetermined distance so that the locating groove lies opposite the rolling tool, and the rolling tool being guided by the locating groove at the commencement of its next advance into the tube stock, so as to be in exact register with the locating groove.

2. A method according to claim 1, wherein the rolling tool and grooving tool, being external to the tube stock, are advanced in step (ii) towards the central axis and the machining operation in step (v) takes place on the bore of the tube stock.

3. A method according to claim 1 or claim 2, wherein the said depth is such that machining in step (v) completes the severance of the end portion.

4. A method according to claim 1 or claim 2, wherein completion of severance takes place after the machining operation, and comprises further advancing the rolling tool in a generally radial direction to part off the end portion from the remainder of the tube stock, the locating groove being partly formed during step (ii) and completed during said further advance of the rolling tool.

5. Apparatus for making rings from tube stock including: a chuck for supporting tube stock cantilevered therefrom on a central axis; a tool head including a body and a part-off type rolling tool mounted in said body on a tool axis parallel to said central axis; means for effecting relative rotation about the central axis as between the chuck and the tool head; and means for moving the tool head radially with respect to the central axis, characterised by a grooving tool of smaller diameter than the rolling tool and located on the said tool axis and having a peripheral working surface of substantially V-profile, the rolling and grooving tools being rotatable about the tool axis and separated from each other by a pre determined axial distance and the grooving tool being nearer the chuck than the rolling tool, and means mounting said tools on the tool head body for controllable limited axial movement with respect to each other and to the chuck.

6. Apparatus according to claim 5, wherein the rolling tool and grooving tool are freely rotatable in the tool head body, and are mounted for said limited axial movement with respect to a datum position in the body.

7. Apparatus according to claim 6, wherein the tool head includes spring means between the body and the said tools, biassing the tools towards the datum position whilst permitting said limited axial movement to either side of the datum position.

8. Apparatus according to claim 7, wherein the mounting means for the said tools includes a spacer element axially separating the tools, the spacer element being in endwise engagement with the said tools but not fixed to them, so that when the grooving tool is constrained against axial movement, the rolling tool can undergo axial movement independently of the grooving tool.

9. Apparatus according to claim 7, wherein the mounting means for the said tools includes a spacer element axially separating the tools and securely connected with the said tools so that the tools and spacer element move as a single unit.

10. Apparatus according to claim 5, including support means arranged to back up the tube stock whilst the rolling and grooving tools are operating thereon.

11. Apparatus according to claim 10, wherein the said support means comprises at least one further tool head disposed at a constant angular displacement from the tool head having a grooving tool, said further tool head including a further body and a further rolling tool mounted in said further body on a further tool axis parallel to the central axis; and means mounting said further rolling tool in said further body for controllable limited axial movement with respect to the chuck, the rolling tools of the apparatus being intersected by a common plane of cooperation between the rolling tools transversely to said central axis.

12. Apparatus according to claim 11, wherein the or each further rolling tool is freely rotatable in the corresponding tool head body and is mounted for limited axial movement with respect thereto.

13. Apparatus according to claim 12, wherein the or each further tool head includes spring means between its body and its rolling tool, biassing the rolling tool towards a datum position co-planar with the datum position of the first mentioned rolling tool, whilst permitting its axial movement to either side of the datum position.

14. Apparatus according to claim 11, wherein the said further tool head or heads include at least one whose rolling tool is a further part-off type rolling tool, the apparatus including means for moving at least one said tool head radially with respect to the central axis in the same manner as, and simultaneously with, the first mentioned tool head.

15. Apparatus according to claim 11, having at least one said further tool head whose rolling tool is a back-up roll having a profile similar to that of the grooving tool, so as to provide back-up support without being adapted to form a parting groove.

16. Apparatus according to claim 15, wherein the back-up roll is so shaped as to roll a chamfer or radius on the tube stock.

* * * * *